United States Patent
Kraljevic et al.

(10) Patent No.: US 12,026,174 B2
(45) Date of Patent: *Jul. 2, 2024

(54) SYSTEMS AND METHODS FOR FACILITATION COMMUNICATIONS AMONG CUSTOMER RELATIONSHIP MANAGEMENT USERS

(71) Applicant: Luminix, Inc., Hilo, HI (US)

(72) Inventors: Tom Kraljevic, San Jose, CA (US); Fernando Rodriguez, III, San Francisco, CA (US); Geetha Vallabhaneni, Alameda, CA (US)

(73) Assignee: Luminix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,391

(22) Filed: Oct. 5, 2022

(65) Prior Publication Data
US 2023/0025016 A1    Jan. 26, 2023

Related U.S. Application Data

(60) Continuation of application No. 17/128,039, filed on Dec. 19, 2020, now Pat. No. 11,475,042, which is a continuation of application No. 16/290,881, filed on Mar. 2, 2019, now Pat. No. 10,909,142, which is a continuation of application No. 15/066,867, filed on Mar. 10, 2016, now Pat. No. 10,268,643, which is a division of application No. 13/898,628, filed on May 21, 2013, now Pat. No. 9,305,073.

(60) Provisional application No. 61/651,515, filed on May 24, 2012.

(51) Int. Cl.
G06F 16/27 (2019.01)
G06Q 30/01 (2023.01)
H04L 67/1095 (2022.01)

(52) U.S. Cl.
CPC ............ *G06F 16/27* (2019.01); *G06F 16/275* (2019.01); *G06Q 30/01* (2013.01); *H04L 67/1095* (2013.01)

(58) Field of Classification Search
None
See application file for complete search history.

(56) References Cited

U.S. PATENT DOCUMENTS

| 9,747,288 B1* | 8/2017 | Beckford | G06F 16/2365 |
| 2003/0182327 A1* | 9/2003 | Ramanujam | G06F 16/273 |
| 2008/0082579 A1* | 4/2008 | Huang | G05B 19/418 |

(Continued)

*Primary Examiner* — Kenny S Lin
(74) *Attorney, Agent, or Firm* — Robert H Lee

(57) ABSTRACT

A method for synchronizing Customer Relationship Management data between a Software as a Service ("SaaS") CRM provider and a mobile device. This method enables both read and write access from the mobile device whether a network connection to the SaaS provider is available or not. The method involves creating a local mobile device database to track portions or all of the SaaS provider database. In the case where a network separation occurs and the device and SaaS databases diverge, the synchronization method may be used to make the mobile device database and the SaaS database consistent and coherent again. In one embodiment, multiple local database tables are used to represent a single SaaS CRM table to facilitate synchronization, and a status indicator is used to visually and quickly convey status to the mobile user.

34 Claims, 13 Drawing Sheets

(56) References Cited

U.S. PATENT DOCUMENTS

2009/0173783 A1* 7/2009 Fomitchev ............. G06Q 20/04
                                                    235/380
2009/0265261 A1* 10/2009 Lew .................... G06Q 40/125
                                                    705/32
2012/0173485 A1* 7/2012 Kothule ................ G06F 16/275
                                                    707/634

* cited by examiner

Contents
--------

1. App database structure
2. Online vs. Offline
3. Sync process high level flowcharts
4. Local operation sequence diagrams
5. Query wave diagram
6. Online indicator states Features
--------

1. Having one main table per SObject with surrounding support tables (to construct the bidirectional sync transactions) means that application queries can always go to the main table without needing to think about patching the values.

2. Having the _orig table means that update and delete transactions can be unwound without the server ever needing to be involved. Having a dedicated _todelete table per SObject enables the getDeleted SOAP call to be made concurrently for all SObjects without any contention.

3. The user can read and write to the main table concurrently while the support tables are being written by the sync algorithm. The sync algorithm perform writes to local tables in an transactional way. Distributed writes may not be transactional, as the Salesforce API does not currently provide for it. As such, we may attempt to do the remote write first before a local write, if appropriate.

4. The sync algorithm is completely interruptable and resumable.

5. The sync algorithm can operate concurrently and safely in the presence of user activity.

6. Convergence. The sync algorithm actually runs in a loop and takes note of whether the cloud was written to or whether modified records have been picked up. If so, it loops again until there are no changes. This has the effect of quickly converging to the most up-to-date state.

Considerations
--------------

1. The getDeleted SOAP API does not accept a window begin time of less than 60 seconds from the current time. This may require separate sync regular and delete sliding windows.

FIG. 1

SYSTEMS AND METHODS FOR FACILITATION COMMUNICATIONS AMONG CUSTOMER RELATIONSHIP MANAGEMENT USERS

APPLICATION PRIORITY DATA

This application is a Continuation Application of U.S. patent application Ser. No. 17/128,039 entitled "SYSTEMS AND METHODS FOR FACILITATING COMMUNICATIONS AMONG CUSTOMER RELATIONSHIP MANAGEMENT USERS" by inventors Kraljevic, Vallabhaneni, and Rodriguez III, filed Dec. 19, 2020, which is a Continuation Application of U.S. patent application Ser. No. 16/290,881 entitled "SYSTEMS AND METHODS FOR FACILITATING COMMUNICATIONS AMONG CUSTOMER RELATIONSHIP MANAGEMENT USERS" by inventors Kraljevic, Vallabhaneni, and Rodriguez III, filed Mar. 2, 2019, which is a Continuation Application of U.S. patent application Ser. No. 15/066,867 entitled "SYSTEMS AND METHODS FOR FACILITATING COMMUNICATIONS AMONG CUSTOMER RELATIONSHIP MANAGEMENT USERS" by inventors Kraljevic, Vallabhaneni, and Rodriguez III, filed Mar. 10, 2016, which is a Divisional Application of U.S. patent application Ser. No. 13/898,628 entitled "SYSTEMS AND METHODS FOR FACILITATING COMMUNICATIONS AMONG CUSTOMER RELATIONSHIP MANAGEMENT USERS" by inventors Kraljevic, Vallabhaneni, and Rodriguez III, filed May 21, 2013, which in turn claims the priority benefit of U.S. Provisional Application No. 61/651,515 entitled "Systems and Methods for Facilitating Communications Among Sales Employees," filed May 24, 2012. All such references are incorporated herein by reference in their entirety.

FIELD OF THE INVENTION

The present invention relates generally to the use of customer relationship management systems, and more specifically, but not by way of limitation, to systems and methods for facilitating communications among customer relationship management users, and in some instances to the bidirectional synchronization of customer relationship management systems and mobile devices.

BACKGROUND

Both mobile computing and software services in the cloud have become very popular in the past decade. Customer relationship management systems, such as the SalesForce software as service ("SaaS"), in particular, have continued to grow in popularity, although asynchronous (e.g., offline) interactions between these systems and mobile devices have yet to be optimized.

BRIEF DESCRIPTION OF THE DRAWINGS

FIG. 1 is a summary of various aspects of the present technology.

DETAILED DESCRIPTION OF EXEMPLARY EMBODIMENTS

Figure 2:
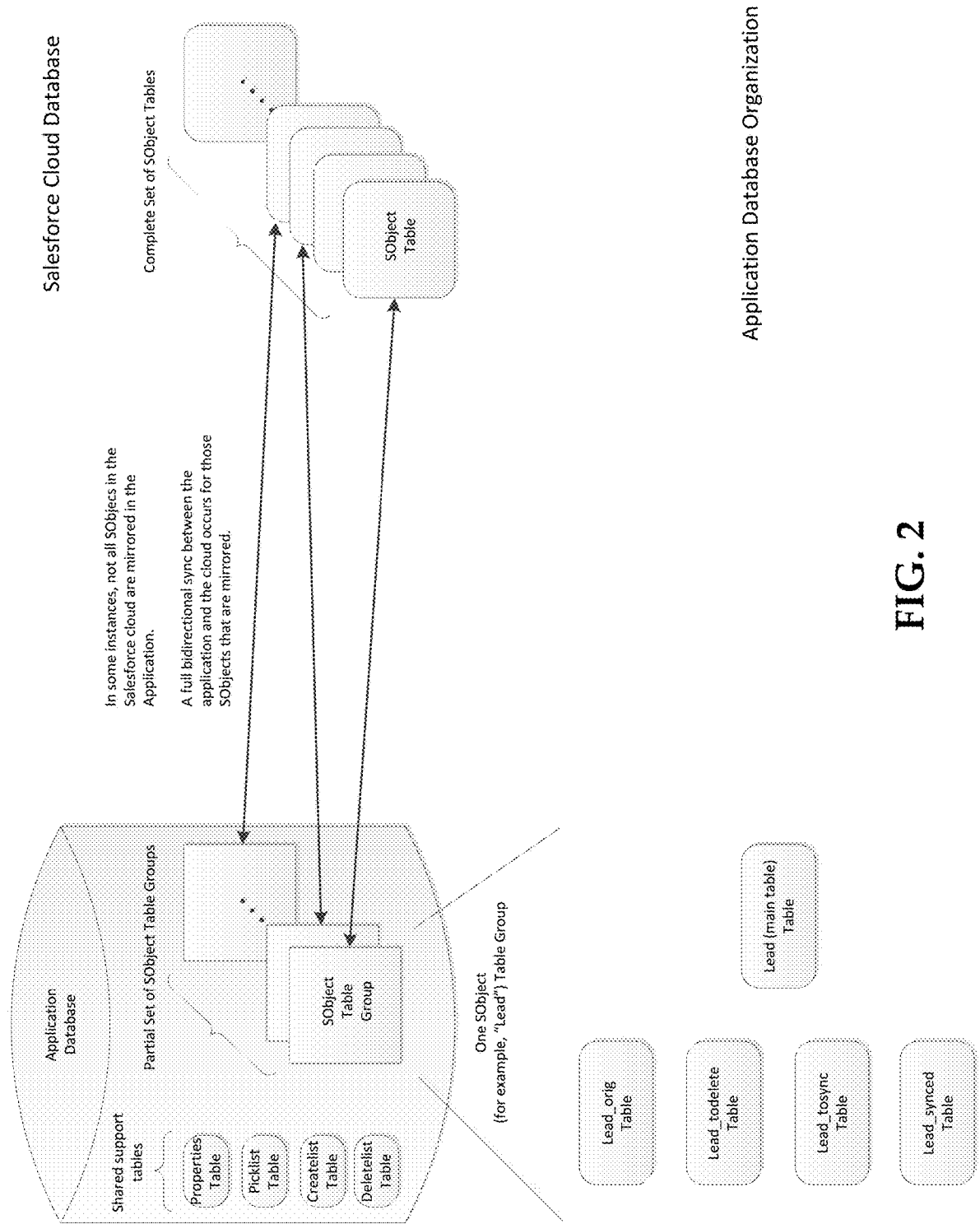
FIG. 2 illustrates bidirectional synchronization between a CRM system and an application database that resides on a mobile device.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Referring now to the collective drawings, FIGS. 1-12, which depict various aspects of bidirectional synchronization between CRM systems and mobile devices. Generally described, the present technology allows a client (e.g., mobile device) to interact with a customer relationship management system, such as the SalesForce SaaS to maintain a coherent data copy that provides high availability to the user. The present technology allows for application data synchronicity even in the presence of network loss or failure, and syncs with the cloud master copy.

Application Database Organization

As background, a customer relationship management ("CRM") system cloud deployment may consist of an RDBMS-like set of tables (otherwise known as entities). Individual CRM systems may have a specific terminology for this generic idea; for example, SalesForce terminology for a table within the CRM platform is an SObject, hereinafter referred to as an "SObject" (singular) or "SObjects" (plural). A constituent part of designing a client application that bidirectionally interacts (e.g., synchronizes) with the CRM system involves establishing a scheme for representing these SObjects locally in the client application, and determining how information between the cloud SObjects and the locally stored SObjects is kept coherent (e.g., synchronized or synced). Algorithms responsible for maintaining this coherence will be referred to as the Synchronization (or Sync) algorithm.

FIG. 2 illustrates an overall approach that may involve any of: (a) using a client local SQL database (such as SQLite) with a set of tables to model each SObject (called an SObject Table group). The present technology may also employ a set of shared singleton support tables and SQL transactions to safely support concurrent user accesses with the synchronization algorithm, as well as a synchronization algorithm to manage the data exchange between the client and server.

Note that in some instances not all server-side tables are necessarily cloned on the client. The Salesforce.com environment has dozens of tables, and a purpose-built client application is unlikely to require all of them, although in some instances the present technology may utilize all server-side tables of the CRM system.

Application Database Details

Figure 3:
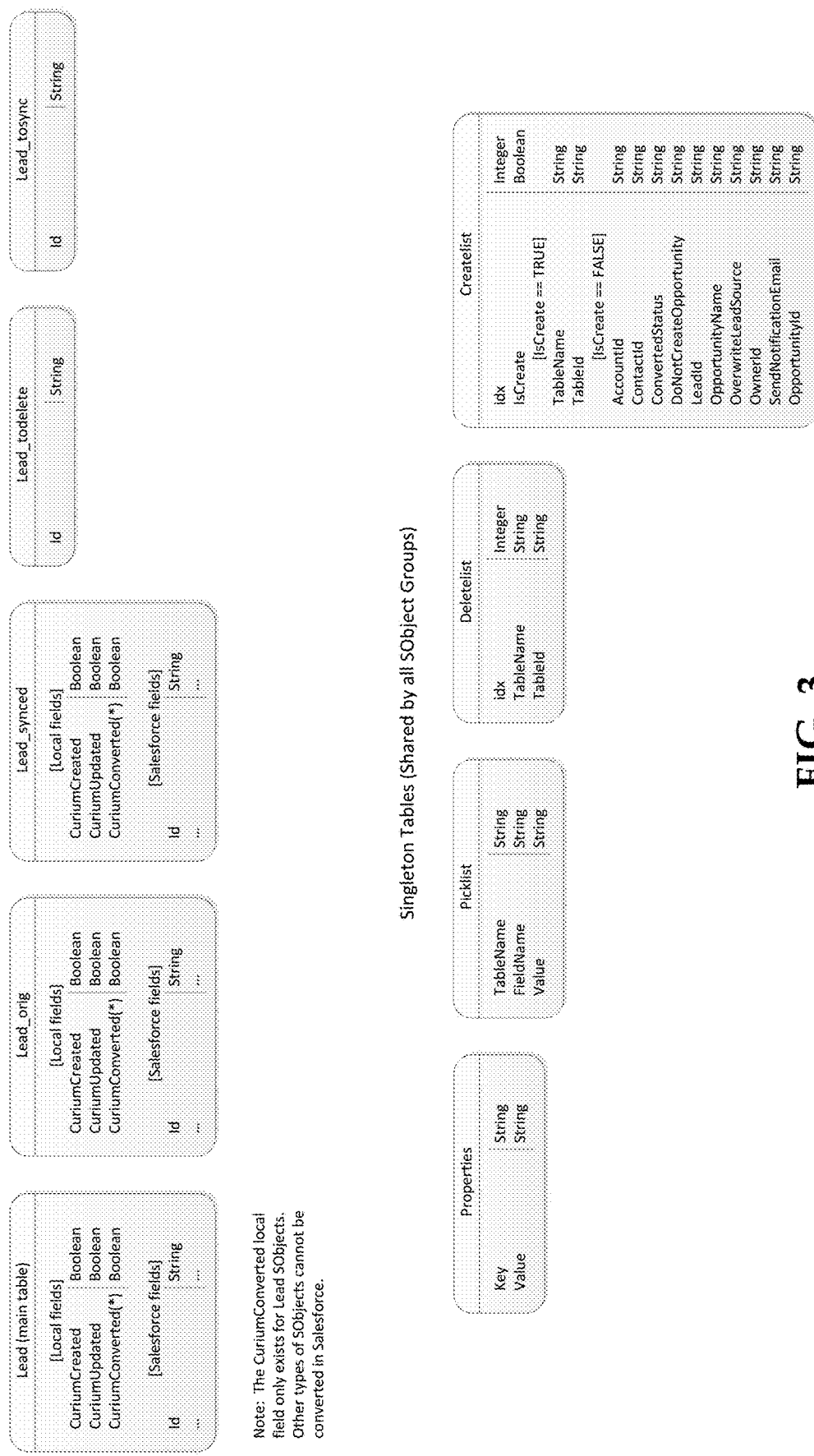
FIG. 3 illustrates various tables of an exemplary application database.

FIG. 3 includes a description and diagram of shared support tables utilized by the present technology. The Property table contains a set of key/value pair properties. The Picklist table contains information from the SObject schema about multiple-choice picklist values for a field. The Createlist table (organized and utilized as a first in first out "FIFO") contains a queue of entries representing local create or convertLead operations. The entry with the lowest idx may be placed at the head of the queue. Entries may be enqueued at the tail and dequeued from the head. The FIFO nature of the Createlist is important because objects in the list may refer to senior objects ahead in the list. If they are not created on the cloud server (e.g., in the correct order, the server may reject the synchronization transaction.

Each Createlist row contains the following fields: (i) idx—queue ordering index; (ii) IsCreate—"TRUE" if the entry represents a create; "FALSE" if the entry represents a convertLead. For the create case: (iii) TableName—Table that the entry was created in; (iv) TableId—The tmpId assigned locally which needs to be replaced with a value assigned by the server.

For the convertLead case, the following fields correspond to the arguments to the Salesforce SOAP API convertLead ( ) Note that the Account, Contact, and Lead Id fields may be either real server-assigned values, or a tmpId locally-assigned value if there is a create operation corresponding to that Id ahead of the convert in the Createlist. The OpportunityId in the Createlist may be either a tmpId or empty (if DoNotCreateOpportunity is "TRUE"). When created objects return from the server, tmpId's may be swapped with real server Id's such that any subsequent entries in the Createlist (as well as all other references in all other tables) may be corrected.

Additional SObjects include, but are not limited to, AccountId; ContactId; ConvertedStatus; DoNotCreateOpportunity; LeadId; OpportunityName; OverwriteLeadSource; OwnerId; and SendNotificationEmail.

OpportunityId—The tmpId may be assigned locally and may need to be replaced with a value assigned by the server. The Deletelist contains the set of entries that have been deleted locally. Note that the Createlist and Deletelist may be empty at the end of a successfully completed sync.

Next we describe each of the tables in an SObject Table Group. <SObject>—The "main table" containing both locally changed and unchanged data entries. Conceptually, this is convenient, because the application may need only look at one table to get its latest data. Special fields (all boolean): CuriumCreated—This entry was locally create; CuriumUpdated—This entry was locally updated; CuriumConverted—(Lead only) This entry was locally converted.

<SObject>_todelete—A list of Ids of objects deleted by the server since the last sync. <SObject>_tosync—[Not typically needed]. A list of IDs of extra objects to fetch from the server. <SObject>_synced—The actual modified objects fetched from the server. <SObject>_orig—A backup of the original unchanged object is made when an object is locally updated or deleted. This is to assist future resolves (with the corresponding server object) or undo the change.

The present technology may utilize the prefix "Curium" or any other arbitrary prefix that does not conflict with naming conventions of the CRM system as a way of distinguishing local-only bookkeeping fields.

The main, _orig, and _synced tables for each SObject contain the entire set of fields that the cloud SObject table contains. Of these, the "Id" field is interesting because it may be used to uniquely identify object instances and correlate instances between the client and server.

Online Vs. Offline Modes

Figure 4:
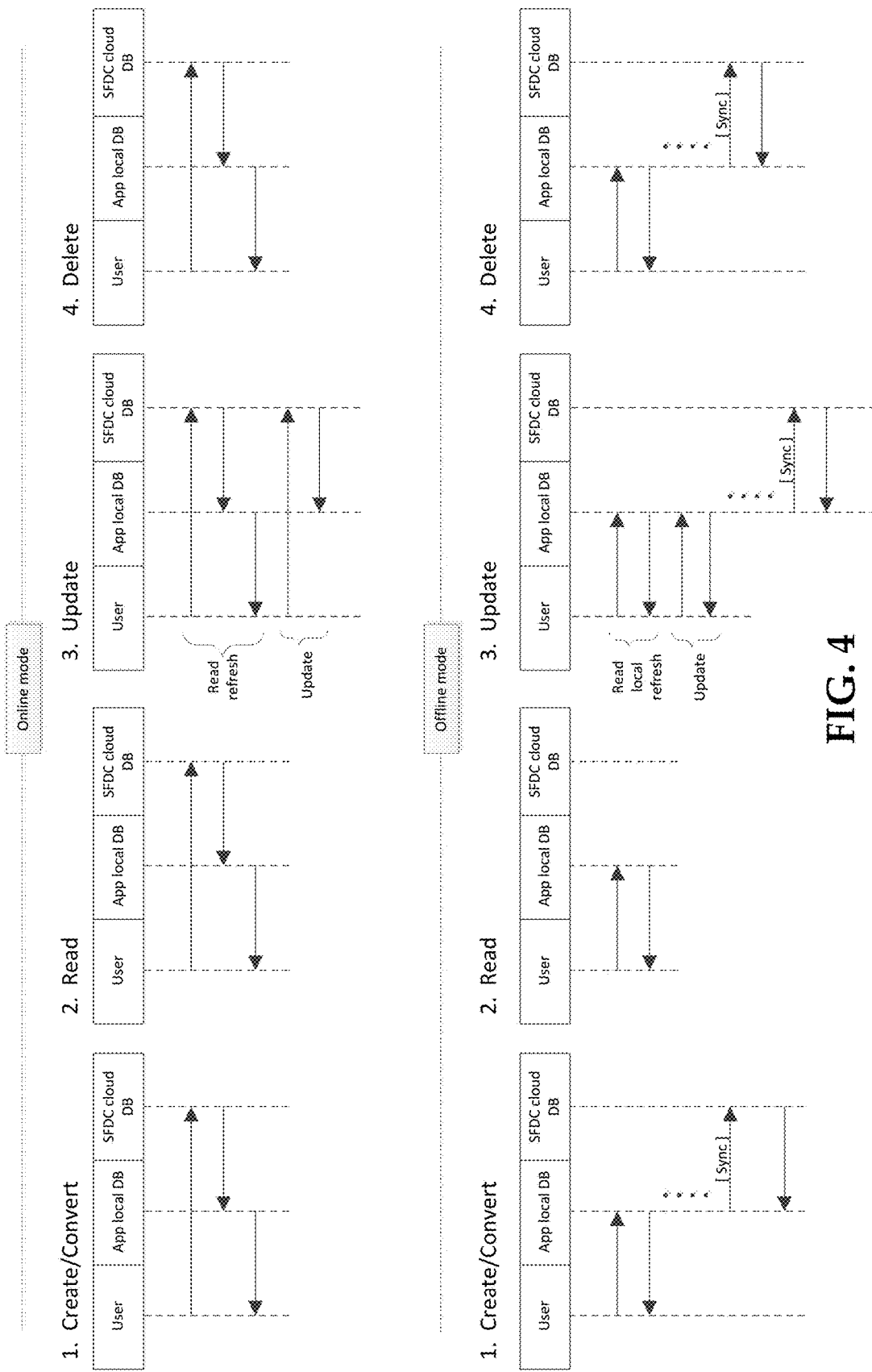
FIG. 4 illustrates various data flow diagrams for various actions between the CRM system and the mobile device that are performed either online or offline.

The present technology may support both online and offline modes [see FIG. 4]. Online mode is straightforward and the interaction between remote and local objects is depicted in FIG. 4. Note that for online cases, the remote object may be accessed first and the local object may be updated to keep the local database as current as possible.

Also note that for the online update case, in order to reduce the probability of a field client and server update collision, the object value may be refreshed immediately upon entering the update flow. This ensures the client has the most up to date copy of the server value possible before attempting the edit.

With regard to offline mode, accesses for the user may be satisfied locally, and writes (e.g., application data) may be stored locally and posted to the cloud server during a (future) synchronization pass.

The following description considers various techniques for implementing a state-of-the-art offline mode. A useful performance-enhancing hybrid mode is an offline-read plus an online-write mode. This is equivalent to the behavior of a write-through cache, where reads are satisfied locally (and are, hence, fast). Moreover writes of application data may go directly to the server (specifically to the customer database of the CRM system) such that the server has the most up-to-date information possible and the client may not be required to carry un-synced changes. This mode works especially well when most accesses are reads and the user is willing to manually initiate a sync when the most up-to-date server data is needed.

Sync Algorithm

Figure 5:
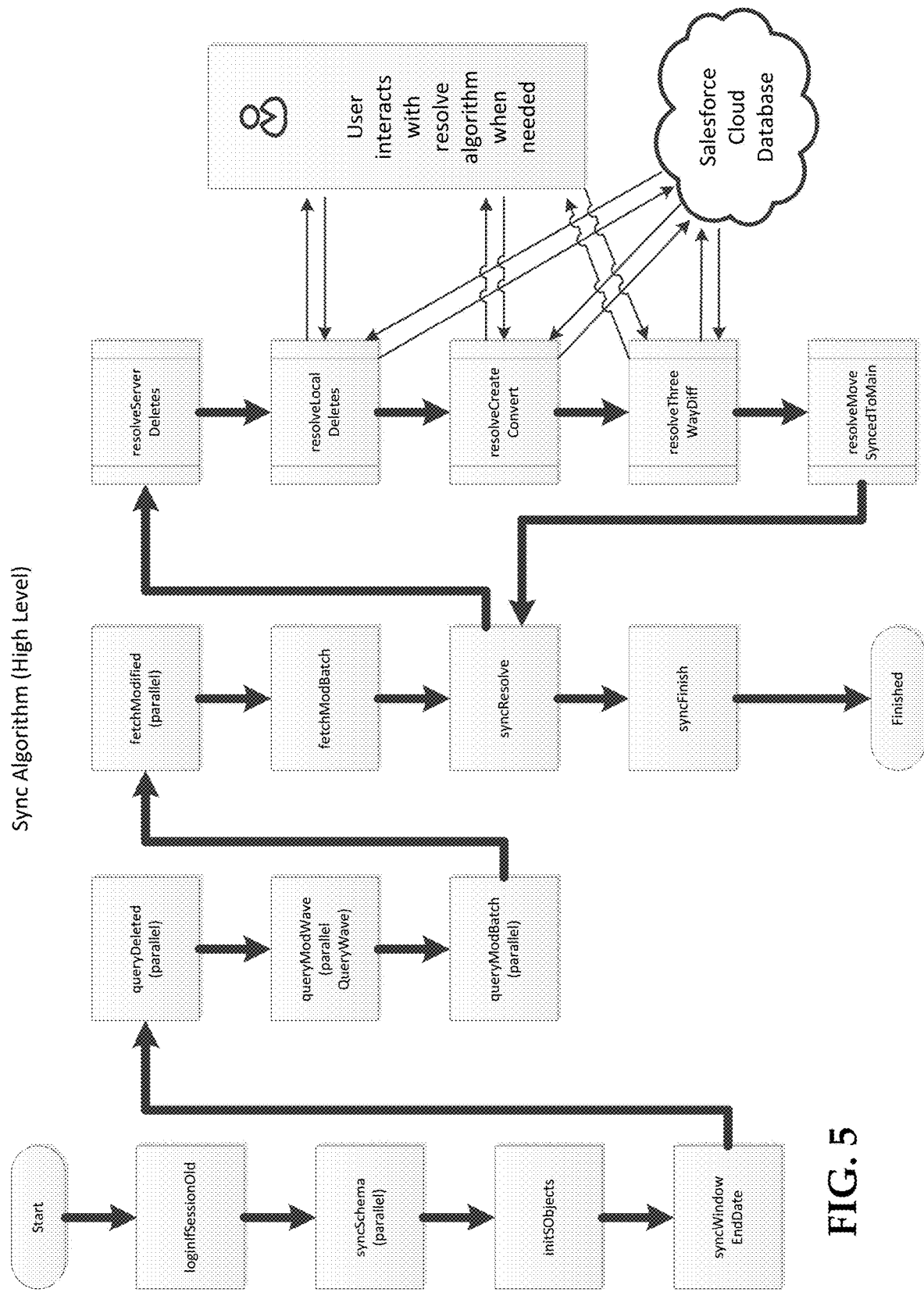
FIG. 5 illustrates an overview of an exemplary method for bidirectionally synchronizing a customer database and a local client database.

FIG. 5 illustrates the operation of a synchronization algorithm that may be responsible for maintaining coherence between the local and cloud databases. The sync algorithm is made safely interruptible and re-startable by storing the current state and progress within that state as properties in the property table.

A Sync process may begin by attempting at get a new Salesforce sessionId if needed (loginIfSessionOld). This attempts to prevent failure of the Sync operation due to an expired session.

The next stage reads the SObject schema. Schema information is stored to the property table to permit offline access, as well as to enable change detection for the cloud schema. In the event of a cloud schema change, the client must perform SQL commands to affect an equivalent change locally to the main, _orig, and _synced tables in the SObject table group. Schema for all SObjects may be queried in parallel. (Salesforce APIs used: REST GET SObject describe.)

The initSObjects stage reads the saved schema information from the property table so the Sync algorithm has access to the field information for each SObject.

The syncWindowEndDate stage calculates the time window for performing the main Sync, as well as a secondary time window for syncing server-side deletes. Unfortunately, due to limitations in the SalesForce getDeleted API, it may not be possible to maintain a single window. This stage uses the end date and time of the previously completed sync as the beginning date and time for the current sync. The end time for the current sync is determined by asking the SalesForce cloud server for its current time. In order to keep things as consistent as possible, the sync algorithm uses the same start and end time for all SObjects. (Salesforce APIs used: SOAP getServerTime).

The queryDeleted stage queries the server for any deleted object Ids for a given SObject within the calculated time range. Any IDs are stored in the _todelete table. Server SObject tables can be queried in parallel, and having a per-SObject_todelete table makes it easy to avoid collisions when storing the results of the concurrent getDeleted( ) queries. (Salesforce APIs used: SOAP getDeleted.)

The queryModWave stage queries the cloud for records created or modified within the sync time window. SObject schema information is used to query all fields of each SObject, or at least a portion thereof. SObjects may be queried in parallel, and the results of the query are stored in the _synced table. The Query Wave concept is described in detail in a later section, with reference to FIG. 11. As a special optimization, to give the application a feeling of immediate usability the first ever time a sync is performed, the first ever sync may safely store results for this stage directly into the main table since it's known that no resolve will need to be performed. (Salesforce APIs used: REST SOQL query.)

The queryModBatch stage may not typically be used. If any data is specifically desired to be fetched by the Bulk API, queries for those requests may be issued here. The fetchModified stage may also not typically be used. If any rows in any of the _tofetch tables are populated, they are read here and stored in their corresponding_synced tables. Generally, there is nothing to do here because the queryModWave stage may read all the created and modified objects itself, as will be described in greater detail below.

Additionally, the fetchModBatch stage may not typically be used. If any batch queries were issued in the queryModBatch stage, the results may be read back here and written to the appropriate _synced table depending on the SObject.

The syncResolve stage walks through the full set of detailed resolve stages (see below). The syncFinish stage cleans up any final sync property values and returns the application to a state of sync not in progress.

Resolve Stages

The resolveServerDeletes stage applies all server-initiated deletes by iterating through the entries in all _todelete tables. Any other table row with an Id value of the deleted object is also deleted.

The resolveLocalDeletes stage applies all locally-initiated deletes from the Deletelist table. In the event that the server rejects the delete operation, the user may be presented with a dialogue asking if he wishes to abandon the change. Doing so simply involves moving the _orig entry for the deleted item back to the main table and deleting the corresponding Deletelist entry. (Salesforce APIs used: REST DELETE query.)

The resolveCreateConvert stage applies all locally-initiated create and convertLead operations. These are stored in the Createlist FIFO. In the event that the server rejects the create or convert operation, the user may be presented with a dialogue asking if he wishes to abandon the change. Alternately, if there is some data validation problem, the user may instead edit a field in the failing object and reattempt the operation. (Salesforce APIs used: REST POST query.)

The resolveThreeWayDiff stage does a three-way-diff between the main, _orig and _synced tables. Entries that have changed on the server get written locally and vice-versa. In the case that a field has changed on both the client and server, the user is prompted to select a winner. Other server rejections of the transaction may result in the user abandoning or editing and retrying, as for the create case. (Salesforce APIs used: REST PATCH query.)

The resolveMoveSyncedToMain stage moves the remaining _synced table entries into their respective main tables.

At the end of a successful complete run of the sync algorithm, assuming there has not been any additional work performed by the user while the sync is running, the SObject main tables will contain all of the object information, and this information will be up to date with the server. All of the other tables in the SObject Table Group (_orig, _synced, _todelete, _tosync) will be empty, and the Createlist and Deletelist shared support tables will be empty.

Note that if the ServerWrittenThisSyncIteration property is set at any point during the iteration, or the query/fetch stages pull new or modified records from the server, the entire sync algorithm is repeated. This provides a converging effect to ensure that when the sync is done the client and server are as up to date as possible.

Sync Algorithm (Typical)

Figure 6:
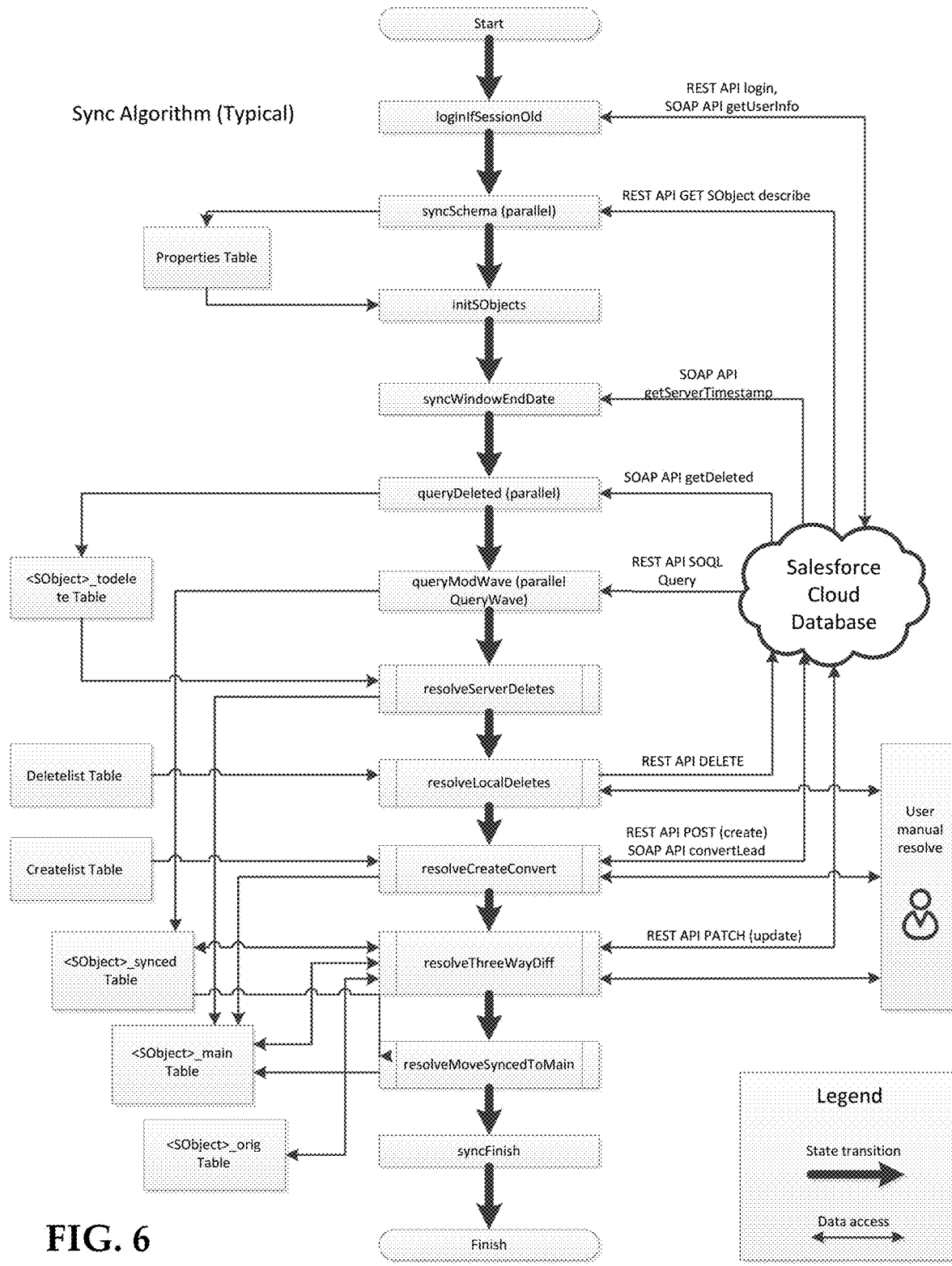
FIG. 6 illustrates a detailed view of the exemplary method of FIG. 5.

FIG. 6 illustrates a typical operation of the sync algorithm and shows in more detail the interaction between the algorithm, some of the local tables, the Salesforce cloud, and the user (as described in the previous section).

Offline Mode Local Transactions

One of the key properties of the SObject Table technique is that the main table may in some instances be made available to the application for user interaction via various actions, some of which will be described in greater detail below.

Create

Figure 7:
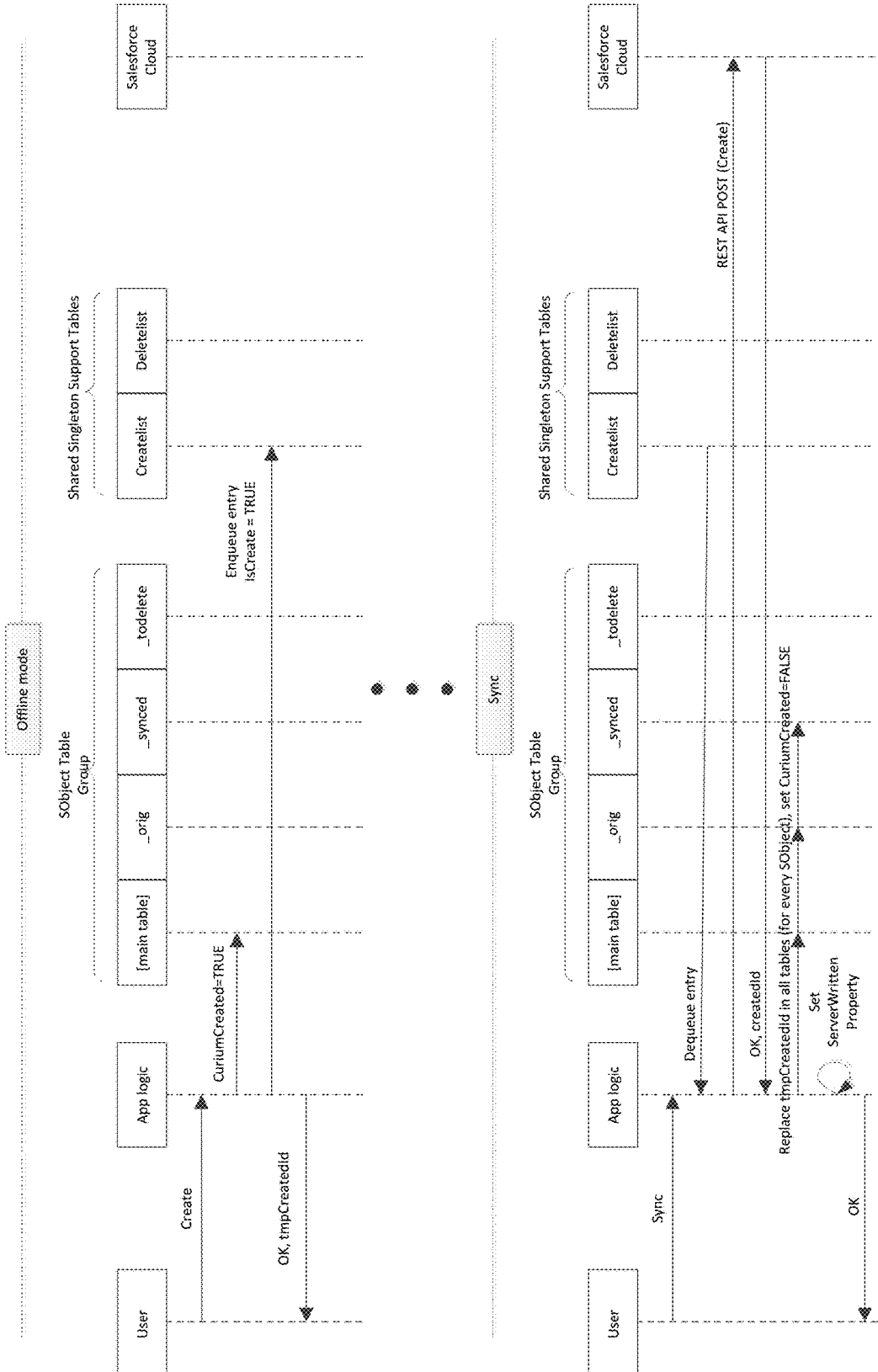
FIG. 7 illustrates an exemplary offline method for creating and utilizing a local client database.

FIG. 7 illustrates a create case where the application creates a unique tmpId, which the application will use temporarily. The application may then swap the tmpId with a real Id when the create operation is posted to the cloud. Then an entry in the SObject main table is created (with CuriumCreated=TRUE) and a Createlist entry is enqueued (with IsCreate=TRUE).

At sync time, the Createlist may be dequeued and the Salesforce REST API POST (create) may be called to get a real ID. This real ID needs to be swapped for the tmpId in all places, or at least a portion thereof. Finally, the ServerWrittenThisSyncIteration property is set to indicate that another iteration of the sync algorithm should take place. This will fetch back the fully formed entry just created on the server since the newly created server-side object's LastModifiedDate will be later than the end window timestamp of the current sync iteration. We want the server's full copy because some fields may be calculated and we don't want to reengineer that work on the client side.

Abandoning a create action simply involves deleting the main table entry and deleting the associated Createlist entry.

Update

Figure 8:
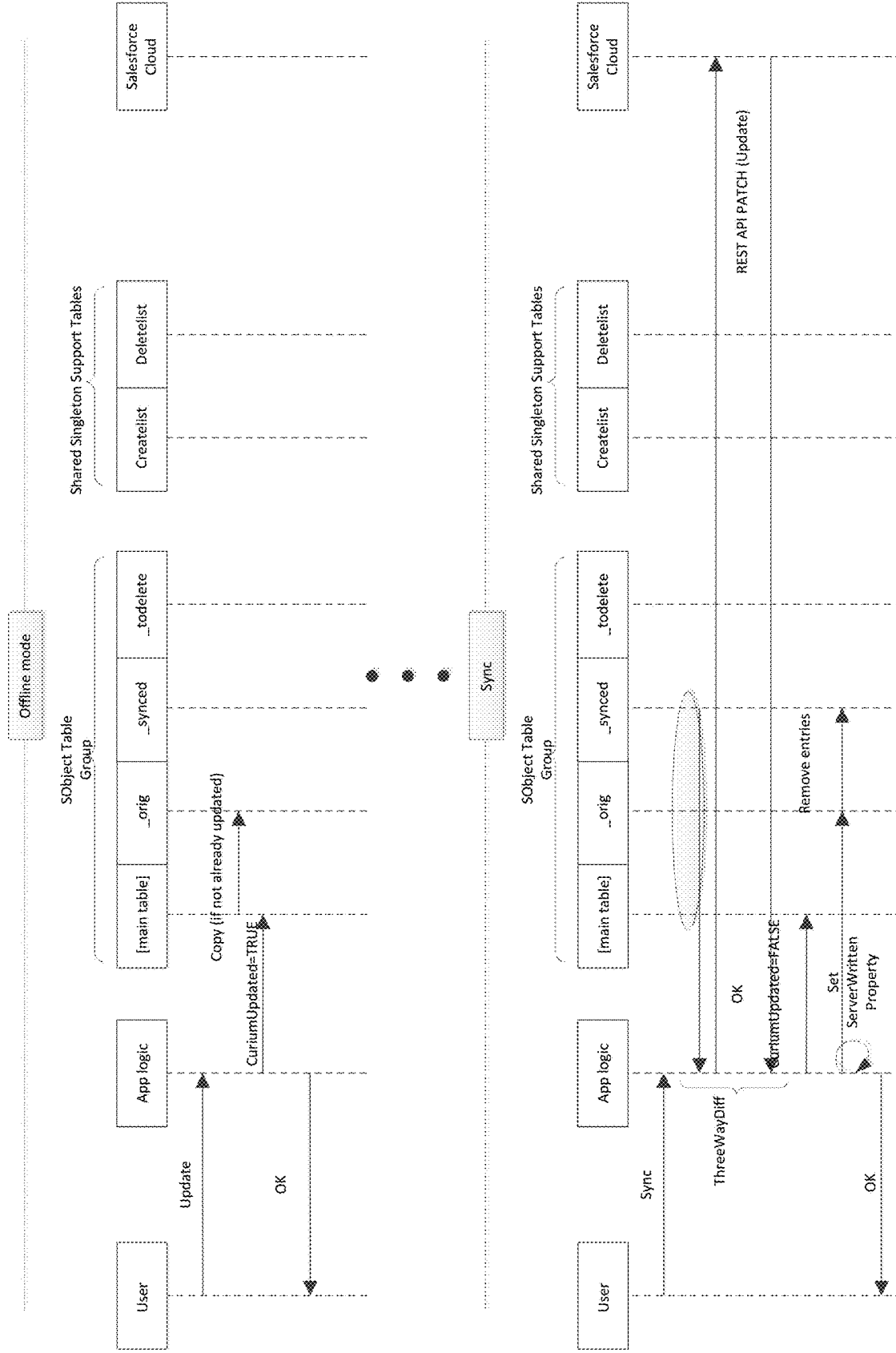
FIG. 8 illustrates an exemplary offline method for updating objects on a local client database.

FIG. 8 illustrates an update case for the application. The first time an untouched SObject row is updated, the application makes a copy of the row in the _orig table. This enables both unwinding of the update as well as enabling the three-way-diff to determine which fields need to be written to the server. In addition, the CuriumUpdated field in the main table object is set to TRUE, so we can now recognize this object as being dirty.

At sync time, the main table, _orig table, and _synced table are compared for this object (correlated by Id). If there is no _synced table entry then this object has not been touched on the server side since the last sync, and the main table object is written to the server. If there is a _synced table entry, then the _orig table is compared to determine whether the field was modified locally or on the server. In the case where both a local and a server modification was made to the same field, the user may be prompted to settle a winner or choose a new value entirely. After doing this three-way compare, the appropriate fields are written to the server (with a Salesforce REST API PATCH (create) call) and the local copies of the object such that they are the same. At this point, the _orig and _tosync table entries (if existing) are deleted and the CuriumUpdated value in the main table should be set to FALSE (since the value now tracks the server value).

Finally, the ServerWrittenThisSyncIteration property is set to indicate another iteration of the sync algorithm should take place. This will fetch back the fully formed entry just written on the server since the server-side object's LastModifiedDate will be later than the end window timestamp of the current sync iteration. Abandoning an update just requires moving the _orig entry back to the main table.

Delete

Figure 9:
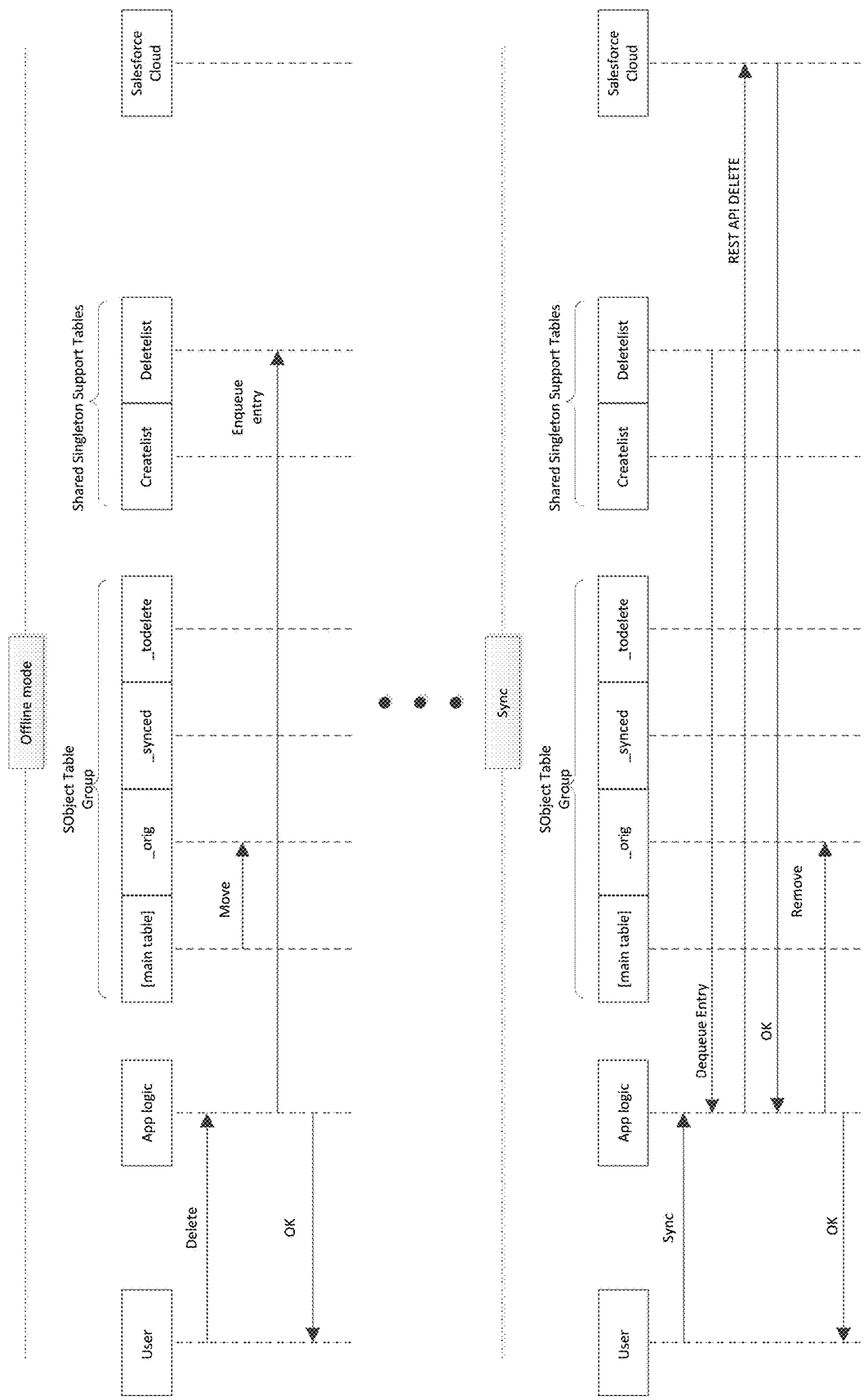
FIG. 9 illustrates an exemplary offline method for deleting objects on a local client database.

FIG. 9 illustrates the operation of a locally-initiated delete case where we move the main table entry into the _orig table and create a Deletelist entry. At sync time, the Deletelist is dequeued, and the Salesforce REST API DELETE method is called with the proper Id. Finally, the local _orig object is deleted. Abandoning a delete only requires moving the _orig entry back to the main table and dropping the Deletelist entry.

Convert

Figure 10:
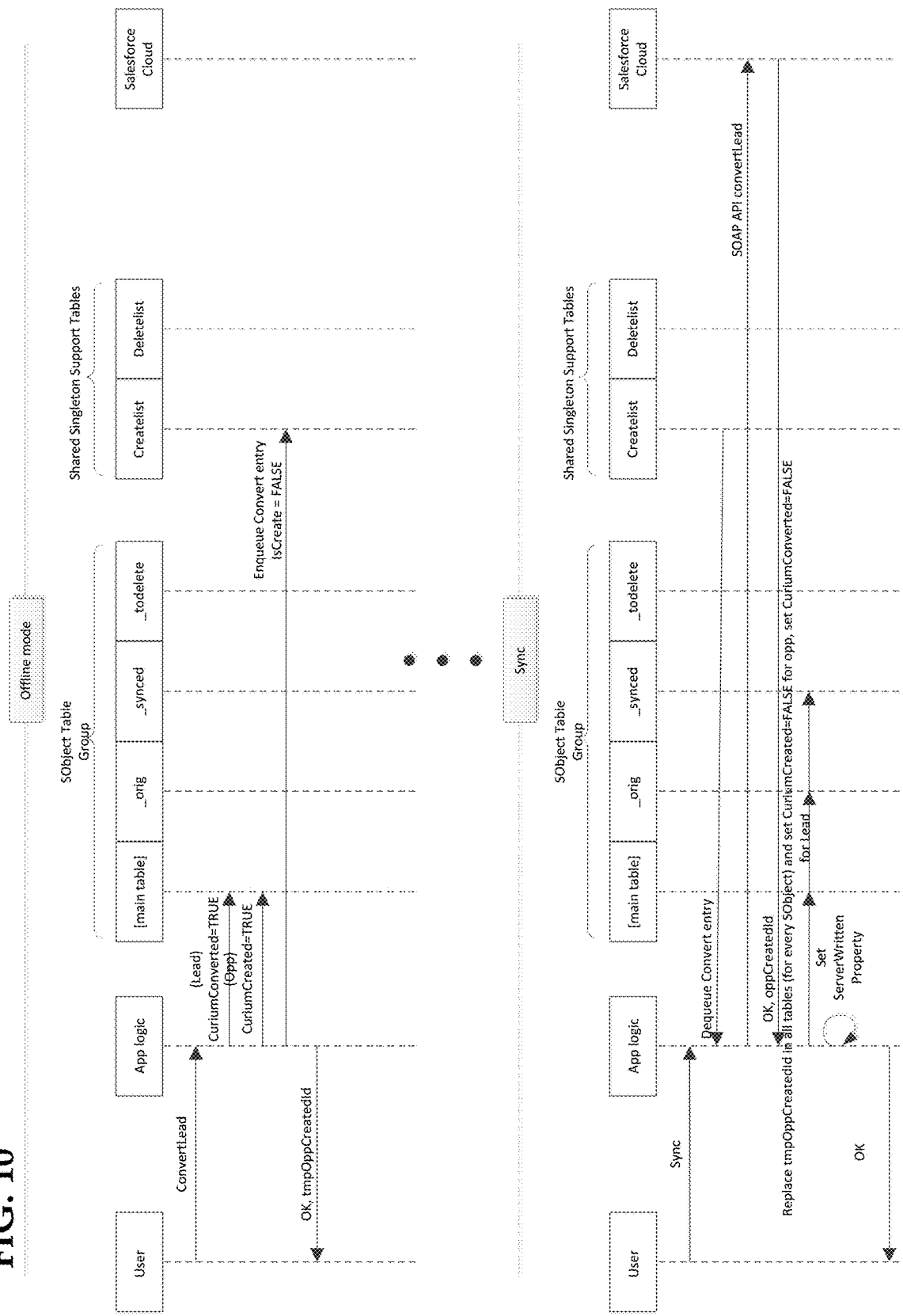
FIG. 10 illustrates an exemplary offline method for converting at least a portion of a local client database.

FIG. 10 illustrates the operation of a convertLead (or convert for short) operation, which may be very similar to create in many respects, since the result of a convert can optionally create an Opportunity SObject record. The first step in a convert is marking the Lead object in the main table with CuriumConverted=TRUE. Next, assuming the convert operation is creating an opportunity, the Opportunity object is created with a tmpId and set with CuriumCreated=TRUE. Finally, a Createlist FIFO entry is enqueued with IsCreate=FALSE and the convertLead arguments stored in the new Createlist row, along with the opportunity tmpId.

At sync time, the Createlist is dequeued (with an IsCreate=FALSE item) and the Salesforce SOAP API convertLead is called to get a real Id. This real Id needs to be swapped for the tmpId in all places. Finally, the ServerWrittenThisSyncIteration property is set to indicate another iteration of the sync algorithm should take place. This will fetch back the fully formed entry just created on the server since the newly created server-side object's LastModifiedDate will be later than the end window timestamp of the current sync iteration. We want the server's full copy because some fields may be calculated and we don't want to reengineer that work on the client side.

QueryWave

Figure 11:
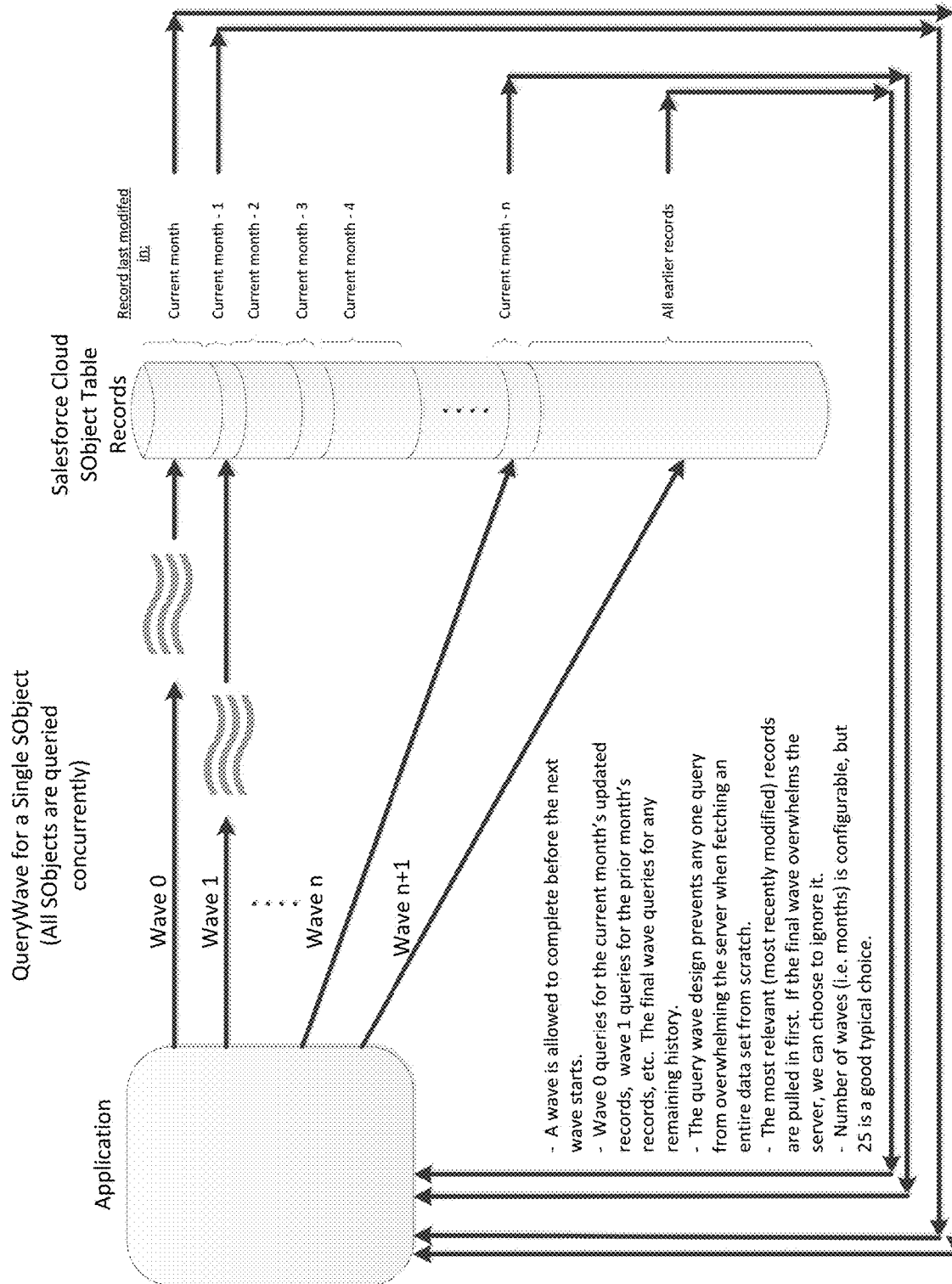
FIG. 11 illustrates an exemplary querywave method.

Referring now to FIG. 11, which illustrates a QueryWave technique for selecting and transferring objects from the Salesforce cloud server to the client. In this instance, the client sends a series of SOQL request "waves" to the server, reading the data a chunk at a time. Each wave request corresponds to one month's (or partial month's) worth of created/modified records. Limiting the amount of data in any one chunk reduces the likelihood the server will timeout in failure trying to build an enormous query response. All SObjects may be queried in parallel for best performance.

OnlineIndicator

Figure 12:
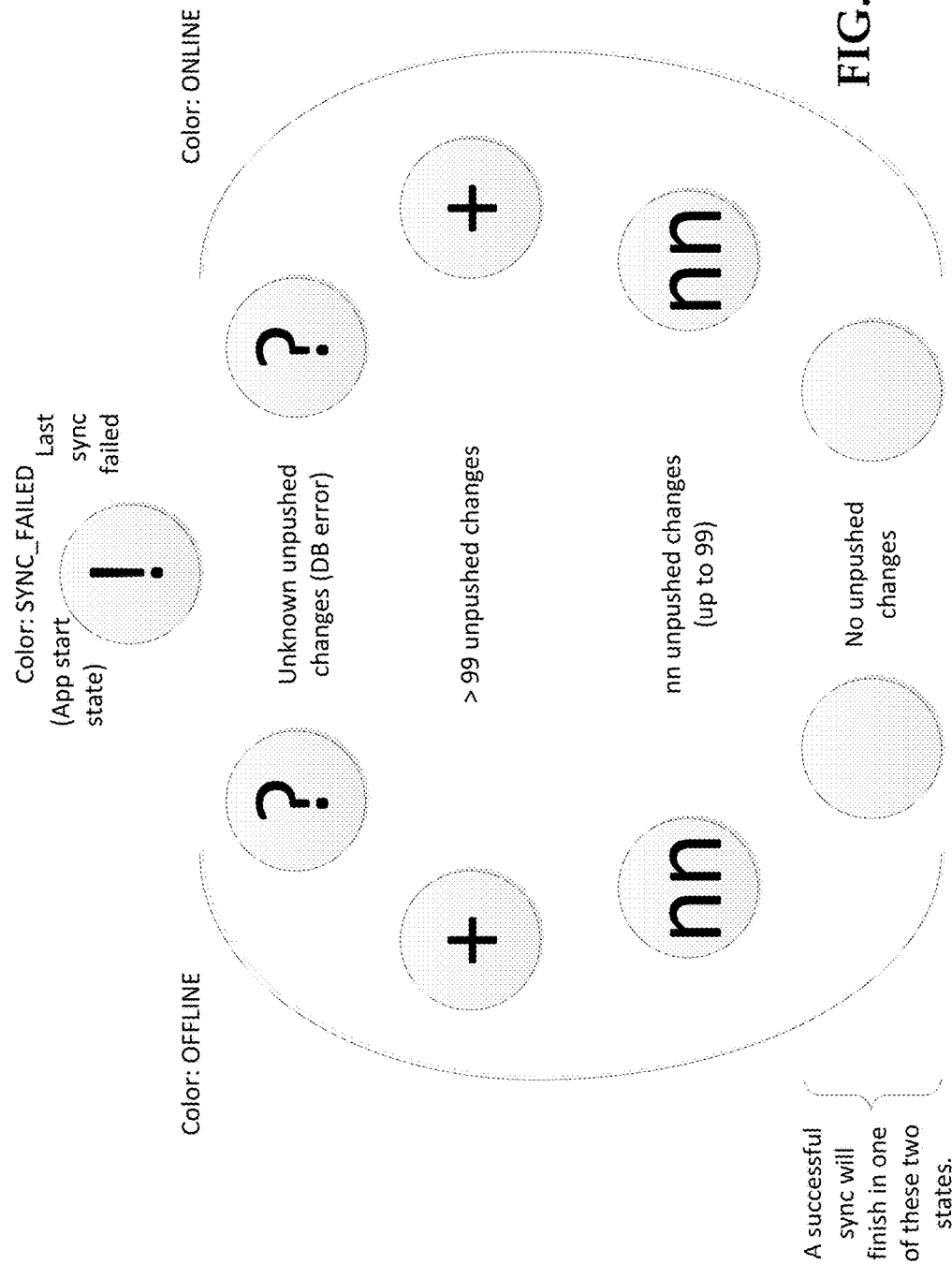
FIG. 12 illustrates an exemplary online indicator and user interface for use in accordance with the present technology.

FIG. 12 illustrates an OnlineIndicator, which is a novel UI component for simultaneously showing the sync status, online/offline status, and the number of local updates that need to be synced to the cloud server. The OnlineIndicator can also be pressed to bring up a short menu of actions available to the user regarding syncing and online/offline state.

Figure 13:
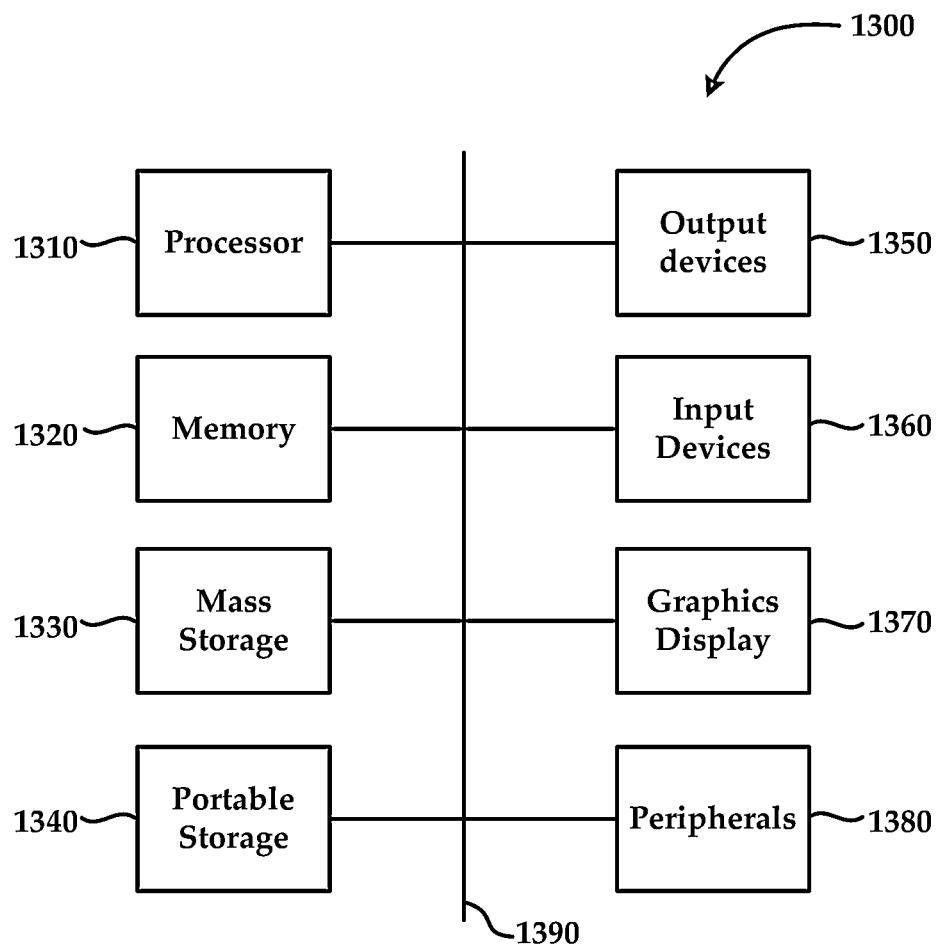
FIG. 13 is a block diagram of an exemplary computing system for implementing embodiments of the present technology.

FIG. 13 illustrates an exemplary computing system 1300 that may be used to implement an embodiment of the present technology. The system 1300 of FIG. 13 may be implemented in the contexts of the likes of computing systems, networks, servers, or combinations thereof. The computing system 1300 of FIG. 13 includes one or more processors 1310 and main memory 1320. Main memory 1320 stores, in part, instructions and data for execution by processor 1310. Main memory 1320 may store the executable code when in operation. The system 1300 of FIG. 13 further includes a mass storage device 1330, portable storage medium drive(s) 1340, output devices 1350, user input devices 1360, a graphics display 1370, and peripheral device(s) 1380.

The components shown in FIG. 13 are depicted as being connected via a single bus 1390. The components may be connected through one or more data transport means. Processor unit 1310 and main memory 1320 may be connected via a local microprocessor bus, and the mass storage device 1330, peripheral device(s) 1380, portable storage device 1340, and graphics display 1370 may be connected via one or more input/output (I/O) buses.

Mass storage device 1330, which may be implemented with a magnetic disk drive or an optical disk drive, is a non-volatile storage device for storing data and instructions for use by processor unit 1310. Mass storage device 1330 may store the system software for implementing embodiments of the present invention for purposes of loading that software into main memory 1320.

Portable storage medium drive(s) 1340 operates in conjunction with a portable non-volatile storage medium, such as a floppy disk, compact disk, digital video disc, or USB storage device, to input and output data and code to and from the computer system 1300 of FIG. 13. The system software for implementing embodiments of the present invention may be stored on such a portable medium and input to the computer system 1300 via the portable storage medium drive(s) 1340.

Input devices 1360 provide a portion of a user interface. Input devices 1360 may include an alphanumeric keypad, such as a keyboard, for inputting alpha-numeric and other information, or a pointing device, such as a mouse, a trackball, stylus, or cursor direction keys. Additionally, the system 1300 as shown in FIG. 13 includes output devices 1350. Suitable output devices include speakers, printers, network interfaces, and monitors.

Graphics display 1370 may include a liquid crystal display (LCD) or other suitable display device. Graphics display 1370 receives textual and graphical information, and processes the information for output to the display device.

Peripheral device(s) 1380 may include any type of computer support device to add additional functionality to the computer system. Peripheral device(s) 1380 may include a modem or a router.

The components provided in the computer system 1300 of FIG. 13 are those typically found in computer systems that may be suitable for use with embodiments of the present invention and are intended to represent a broad category of such computer components that are well known in the art. Thus, the computer system 1300 of FIG. 13 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for managing data in a customer relationship management system and a related client application, the method comprising:
   issuing a query from the client application to the customer relationship management system, wherein the query requests data from a table in a server database, and updating the data to a table in a local database;
   updating the local database table with locally obtained client application data; and
   sending the locally obtained client application data from the local database table to the customer relationship management system to update the server database table;
   wherein the table in the local database comprises a database table, the database table comprising at least three representations: the first representation comprising an orig table representing the database table as previously synced with the customer relationship management system, the second representation comprising a main table representing the database table as updated with local information, and a third representation comprising a sync table representing the database synced table as newly updated with server information.

2. The method of claim 1 wherein updating the local database table with locally obtained client application data occurs while the client application is not connected to the customer relationship management system.

3. The method of claim 1 further comprising creating the local database table in the local database.

4. The method of claim 1 wherein a temporal history queried by the query is less than the total temporal history of the table in the server database.

5. The method of claim 1 wherein the database table is updated with both local and server information to update the database table in final form.

6. The method of claim 1 further comprising sending a second query wherein the second query requests additional data from the server database table, and updating the additional data to the local database table.

7. The method of claim 1 wherein the database in a SQL database.

8. The method of claim 1 wherein the database in a CRM database.

9. A method for managing data in a customer relationship management system and a related client application, the method comprising:
   receiving a query from the client application, wherein the query requests data from a table in a server database; and
   receiving locally obtained client application data from the local database table to update the server database table;
   wherein the table in the local database comprises a database table, the database table comprising at least three representations: the first representation comprising an orig table representing the database table as previously synced with the customer relationship management system, the second representation comprising a main table representing the database table as updated with local information, and a third representation comprising a sync table representing the database synced table as newly updated with server information.

10. The method of claim 9 wherein the locally obtained client application data is updated to the local database table before being received by the customer relationship management system.

11. The method of claim 9 wherein the locally obtained client application data is updated to the local database table while the client application is not connected to the customer relationship management system.

12. The method of claim 9 wherein further comprising sending instructions for creating the local database table in the local database.

13. The method of claim 9 wherein a temporal history of the query is less than the total temporal history of the table in the server database.

14. The method of claim 9 wherein the database table is updated with both local and server information to update the database table in final form.

15. The method of claim 9 further comprising receiving a second query requesting additional data from the server database table.

16. The method of claim 9 wherein the database in a SQL database.

17. The method of claim 9 wherein the database in a CRM database.

18. A non-transitory computer-readable medium for storing software instructions that, when executed by a processor, executes a method for managing data in a customer relationship management system and a related client application, the method comprising:

issuing a query from the client application to the customer relationship management system, wherein the query requests data from a table in a server database, and updating the data to a table in a local database;

updating the local database table with locally obtained client application data; and sending the locally obtained client application data from the local database table to the customer relationship management system to update the server database table;

wherein the table in the local database comprises a database table, the database table comprising at least three representations: the first representation comprising an orig table representing the database table as previously synced with the customer relationship management system, the second representation comprising a main table representing the database table as updated with local information, and a third representation comprising a sync table representing the database synced table as newly updated with server information.

19. The medium of claim 18 wherein updating the local database table with locally obtained client application data occurs while the client application is not connected to the customer relationship management system.

20. The medium of claim 18 wherein the method further comprises creating the local database table in the local database.

21. The medium of claim 18 wherein a temporal history queried by the query is less than the total temporal history of the table in the server database.

22. The medium of claim 18 wherein the database table is updated with both local and server information to update the database table in final form.

23. The medium of claim 18 wherein the method further comprises sending a second query wherein the second query requests additional data from the server database table, and updating the additional data to the local database table.

24. The method of claim 18 wherein the database in a SQL database.

25. The method of claim 18 wherein the database in a CRM database.

26. A non-transitory computer-readable medium for storing software instructions that, when executed by a processor, executes a method for managing data in a customer relationship management system and a related client application, the method comprising:

receiving a query from the client application, wherein the query requests data from a table in a server database; and receiving locally obtained client application data from the local database table to the customer relationship management system to update the server database table;

wherein the table in the local database comprises a database table, the database table comprising at least three representations: the first representation comprising an orig table representing the database table as previously synced with the customer relationship management system, the second representation comprising a main table representing the database table as updated with local information, and a third representation comprising a sync table representing the database synced table as newly updated with server information.

27. The medium of claim 26 wherein the locally obtained client application data is updated to the local database table before being received by the customer relationship management system.

28. The medium of claim 26 wherein the locally obtained client application data is updated to the local database table while the client application is not connected to the customer relationship management system.

29. The medium of claim 26 wherein the method further comprises sending instructions for creating the local database table in the local database.

30. The medium of claim 26 wherein a temporal history of the query is less than the total temporal history of the table in the server database.

31. The medium of claim 26 wherein the database table is updated with both local and server information to update the database table in final form.

32. The medium of claim 26 wherein the method further comprises receiving a second query requesting additional data from the server database table.

33. The method of claim 26 wherein the database in a SQL database.

34. The method of claim 26 wherein the database in a CRM database.

* * * * *